United States Patent Office 2,779,734
Patented Jan. 29, 1957

2,779,734
COMPOSITION FOR USE IN WELLS

Donnell M. Buchanan and Paul L. Menaul, Tulsa, Okla., assignors to Stanolind Oil and Gas Company, Tulsa, Okla., a corporation of Delaware No Drawing. Application November 12, 1954, Serial No. 468,572

8 Claims. (Cl. 252—8.55)

This invention relates to compositions for use in wells and is directed particularly to a composition useful for the hydraulic fracturing of well formations. While the composition has particular utility for formation fracturing in oil and gas wells, its properties are such that it is useful also for other types of well treatment requiring the use of very viscous oily liquids.

With the widespread use of hydraulic fracturing for stimulating the production of fluids from well formations, the desired properties of the fluids to be used have become generally known. A fracturing fluid must not be injurious to the well formations, which means, in the case of oil and gas wells, that it should be oil or oily in nature. It must be viscous enough to permit the build-up of fracturing pressure in the well bore without being too viscous to be pumped down the well tubing or casing. After a period of time, the viscosity should drop to as low a value as possible so as not to block the produced fracture and to facilitate removal of the fracturing liquid from the formation or well bore. Preferably the fluid should be easy to prepare in the field, should require only inexpensive components, and should be capable of utilizing a wide variety of base liquids. Further, the viscous fluid should have good carrying properties for propping agents, and in many cases the rate of fluid loss to porous formations upon application of pressure to the fluid should be controllable.

It is a primary object of our invention to provide a well-treating or fracturing liquid composition which substantially meets all of the foregoing requirements and has the desired properties. Another object is to provide such a liquid composition which is particularly adaptable to the fracturing of gas-producing formations. Still other and further objects, uses, and advantages of the invention will become apparent as the description proceeds.

Briefly stated, the foregoing and other objects are accomplished according to our invention by emulsifying a major proportion of a hydrocarbon liquid and a minor proportion of water with an emulsifying agent comprising the reaction product of an organic acid, preferably a fatty acid, with a water-soluble amine. As this composition results in a stable, highly viscous emulsion or gel, there is also included for formation-fracturing purposes a dormant demulsifying or gel-breaking agent in the composition. The dormant gel-breaking or demulsifying agent is preferably a material, such as a halogenated organic compound, which hydrolyzes slowly in the presence of water to form a weak solution of a strong acid capable after a period of time, of decomposing or reacting with the fatty acid-amine emulsifying agent and thereby destroying its effectiveness, so that the fracturing liquid reverts to the viscosity of its original components.

A particular advantage of the compositions of this invention is the very wide range of hydrocarbon liquids which may be utilized as the base liquid. We have successively formed thick emulsions with substantially all liquid hydrocarbons ranging from liquefied petroleum gas, natural gasoline, and pentane to heavy fuel oils such as No. 5 fuel oil, and including between these extremes a great many crude oils of various viscosities. In general, it is of course desirable to use as the base liquid a hydrocarbon of relatively low viscosity, as otherwise the liquid may be difficult to displace from the well formation after viscosity reduction has taken place. A particular advantage in fracturing gas-producing formations with the composition of the present invention is the fact that vaporizable liquid hydrocarbons such as liquefied petroleum gas can be utilized, so that, after viscosity reduction within the formations has occurred, any fracturing liquid which does not return to the well bore as a liquid can be vaporized into the formation gas and thus removed from the formations in the vapor state.

The organic acid employed for forming the emulsifying agent is preferably a carboxylic acid or a mixture of such acids, for example, fatty acids containing at least twelve carbon atoms to the molecule. Emulsifying agents formed with acids of lower molecular weight than these are less effective. Representative of the acids which we have successfully used are oleic acid, linoleic acid, linolenic acid, stearic acid, naphthenic acids, and the like. While fatty acids in solid forms, such as stearic acid, can be used by heating the acid to liquefy it and thus assist its solution into the base hydrocarbon liquid, it is preferred to use the fatty acids which are normally in liquid form such as the liquid oleic acid or naphthenic acids commercially available. Also, we may use mixtures of liquid fatty acids such as tall oil or rosin acids, or acids derived from the liquid-phase partial oxidation of hydrocarbons such as kerosene.

Choice of a fatty acid may also in part depend on the anticipated maximum bottom-hole temperature during treatment. Thus, naphthenic acids are to be preferred for wells in the range from 85° to 135° F., while oleic acid is better in the range from 135° to 215° F.

Although the fatty acid-amine emulsifying agent can be preformed by directly reacting the acid and amine, and the resulting compound added to, dissolved in, or dispersed in either the hydrocarbon or the water phase of the mixture to be emulsified, it is preferred to dissolve the acid in the base hydrocarbon liquid and the amine in the water, so that the emulsifying agent is formed in the process of mixing the oil and water for emulsification.

A wide variety of amines or amine derivatives are suitable for forming the emulsifying agent by reaction with the foregoing fatty acids. Such compounds, however, should be water soluble and include, for example the water-soluble amines, hydroxy amines, and imide oxides such as diethylene imide oxide.

As examples of the amines we have used with success, the following table shows the amounts of different amines in milliliters needed for emulsifying with water fifty milliliters of kerosene to which had been added one milliliter of a fatty acid.

TABLE I

| Amine Type | Amount added in ml. per 50 ml. of kerosene containing one ml. of fatty acid | Max. Viscosity in Centipoises after 2 min. stirring |
|---|---|---|
| Dibutyl Amine | 0.20 | 800 |
| Amino ethyl ethanol | 0.15 | 700 |
| 1-hydroxyethyl 2-heptadecenyl glyoxalidine | 0.30 | 1,000 |
| Diphenyl Amine | 0.30 | 1,000 |
| Morpholine | 0.15 | 2,950 |
| Monoethanolamine | 0.11 | 4,000 |

While it is evident from these data that the morpholine and monoethanol amine salts of the fatty acid produced the highest viscosity gels, it is also apparent that the gels produced with the other amine salts were of highly satisfactory viscosity. Also, the viscosity of these gels is found to vary with the quantity of water incorporated, which quantity may vary between about 2% and 8% by volume. In most cases the maximum viscosity is obtained when the water constitutes between 4% and 5% by volume of the resulting gel.

Since, for purposes of formation fracturing, it is desired that these gels or emulsions have only a temporary stability, so that, after a few hours, their viscosities drop to as low values as possible, a further and important feature of our invention resides in the use of a dormant or slow-acting demulsifier or gel breaker in combination with said gels or emulsions. Suitable compounds for this purpose are those which hydrolyze slowly in the presence of water to produce an acid capable of decomposing or otherwise lowering the effectiveness of the fatty acid-amine salt emulsifying agent. This hydrolysis should take place over the period of time when demulsification or breaking of the gel is desired and should therefore take place neither too rapidly nor too slowly. Representative of materials which hydrolyze at the desired rate under bottom-hole temperature conditions and in the presence of the water concentrations used in these gels are halogenated organic compounds such as, for example, benzotrichloride. The compound, after a suitable period of time, yields hydrochloric acid which decomposes the fatty acid-amine salt.

Thus, by incorporating in the gel composition from about 0.2% to about 0.4% by volume of a suitable halogenated organic compound such as benzotrichloride, the viscosity of the gel composition decreases from maximum values ranging between 600 and 5,000 or more centipoises to a value of less than 100 centipoises in from four to twelve hours under ordinary bottom-hole temperature conditions, and ultimately the viscosity of said composition becomes substantially that of the base hydrocarbon liquid. When the preferred liquid fatty acids, naphthenic and oleic, are used to form the amine salts, about 0.3% by volume of benzotrichloride produces the desired viscosity reduction in between four and twelve hours. When a crude, solid form of the fatty acid, mainly stearic acid is employed, the amount of benzotrichloride should be varied between about 0.15% and 0.45% by volume depending on the maximum well temperature, the smaller percentages being effective at the higher temperatures.

By way of example, a typical preferred formulation and procedure for mixing is as follows, all parts being by volume: Oil 330 parts, liquid fatty acid 3.5 parts (oleic or naphthenic), and benzotrichloride 1.0 part are thoroughly premixed to form a solution A. In another container are premixed about 14 parts of water and 0.75 part of monoethanolamine to form a solution B. Thereafter, about equal parts of solutions A and B are placed together and agitated to form a primary emulsion. To this the remainder of soltuion A is slowly added with continuing agitation. There results a gel of from 2000 to 5000 centipoises viscosity, which in about six hours at 140° F. reverts to substantially the viscosity of the oil base, which may be, for example, 5 centipoises.

The relative amounts of the fatty acid and the amine used in formulating this gel are approximately in their stoichiometric ratio. The combined volume percent of fatty acid, amine, and benzotrichloride in the gel may vary from about 1% to 2.5%, about 1.5% normally being preferred.

A gel prepared according to the present invention may have a fluid loss or filtrate rate of about 300 cc. per minute as measured by the standard API filtrate rate test for drilling fluids. If substantial reduction in this rate of fluid loss is desired, it may be achieved by adding granular materials in a proper gradation of particle sizes, such as, for example, ground oyster shells, ground hard nut shells, and the like, with particles ranging from about 1/16 to 100-mesh or smaller in size.

As an example of the use of this invention in gelling light hydrocarbons, 400 gallons of a natural gasoline having a vapor pressure of 26 pounds per square inch were mixed in a pressure tank with 4.4 gallons of naphthenic acids and 1.25 gallons of benzotrichloride to form a solution A. In another pressure tank a solution B was prepared consisting of 0.7 gallon of monoethanolamine in 17 gallons of water. After thorough premixing of each of these solutions A and B, the oil solution A was slowly added to the water solution B with continuous and thorough agitation. The entire volume of oil was added to the water over a period of about 20 minutes, and after two hours the resulting gel showed a viscosity of about 2800 centipoises, as measured by the Gardner Mobilometer. After standing for 16 hours at a temperature of 90° F. this gel had reduced in viscosity to about 1 centipoise.

As further examples of the wide range of base oils which may be gelled by this invention, we have tested crude oils from North Dakota, Wyoming, Colorado, and Nebraska, ranging in gravity from 27° to 47° API and have obtained good gels ranging from 1000 to about 4000 centipoises initial viscosity, as measured by the Gardner Mobilometer. As a precaution, however, care should be exercised to ascertain that the crude oil employed has not been treated with demulsifying agents or stored in tanks previously containing demulsified oil, as the presence of even small amounts of such demulsifying agents in the oil may affect the operation of the fatty-acid-amine emulsifier. Also, as different crude oils have varying natural tendencies to emulsify with water, it is advisable to run a pilot test of this invention on a small quantity of the oil before undertaking a large scale gelling operation.

With gels of the viscosity obtained when prepared by use of this invention, there is no difficulty in suspending granular propping agents in the gel in about any concentration that may be desired. For example, we have successfully suspended five or more pounds of sand per gallon, for use as the propping agent in hydraulic formation fracturing, without the occurrence of any apparent settling-out whatever.

While we have thus described our invention in terms of the foregoing specific embodiments and examples, it is to be understood that further modifications will be apparent to those skilled in the art. The invention, therefore, should not be considered as limited to the examples set forth, but its scope is properly to be ascertained from the appended claims.

We claim:

1. A temporarily viscous gel composition comprising a major proportion of hydrocarbon liquid, a minor proportion of water, a stabilizing amount of an emulsifying agent comprising the reaction product of a water-soluble amine and a carboxylic acid selected from the group consisting of fatty acids containing at least 12 carbon atoms per molecule and naphthenic acids, and from 0.15 to 0.45 volume percent of benzotrichloride.

2. A temporarily viscous gel composition comprising by volume from about 89 to about 97 percent hydrocarbon liquid, from about 2 to about 8 percent water, from about 0.15 to about 0.45 percent benzotrichloride, and from about .55 to about 2.35 percent of a water-soluble amine and a carboxylic acid selected from the group consisting of fatty acids containing at least 12 carbon atoms per molecule and naphthenic acids, said amine and acid being present in approximately their stoichiometric proportions.

3. A temporarily viscous gel composition as in claim 2 wherein said amine and said acid are respectively monoethanolamine and naphthenic acid.

4. A temporarily viscous gel composition as in claim 2 wherein said amine and said acid are respectively morpholine and naphthenic acid.

5. A temporarily viscous gel composition comprising by volume about 4 percent water, about 1.2 percent of a water-soluble amine and a fatty acid containing at least 12 carbon atoms per molecule in approximately their stoichiometric proportions, and about 0.3 percent benzotrichloride, the balance being a hydrocarbon liquid.

6. A temporarily viscous gel composition as in claim 5 wherein said hydrocarbon liquid is liquefied petroleum gas.

7. A temporarily viscous gel composition as in claim 5 wherein said amine and said fatty acid are respectively monoethanolamine and oleic acid.

8. A temporarily viscous gel composition as in claim 5 wherein said amine and said fatty acid are respectively morpholine and oleic acid.

References Cited in the file of this patent

UNITED STATES PATENTS

| | | |
|---|---|---|
| 2,224,297 | Holmes | Dec. 10, 1940 |
| 2,238,671 | Woodhouse | Apr. 15, 1941 |
| 2,667,457 | McChrystal | Jan. 26, 1954 |
| 2,668,098 | Alm | Feb. 2, 1954 |
| 2,675,354 | McChrystal et al. | Apr. 13, 1954 |